Dec. 4, 1956     L. E. WETTSTEIN     2,772,893
LOAD EQUALIZING TRAILER HITCH
Filed July 23, 1954
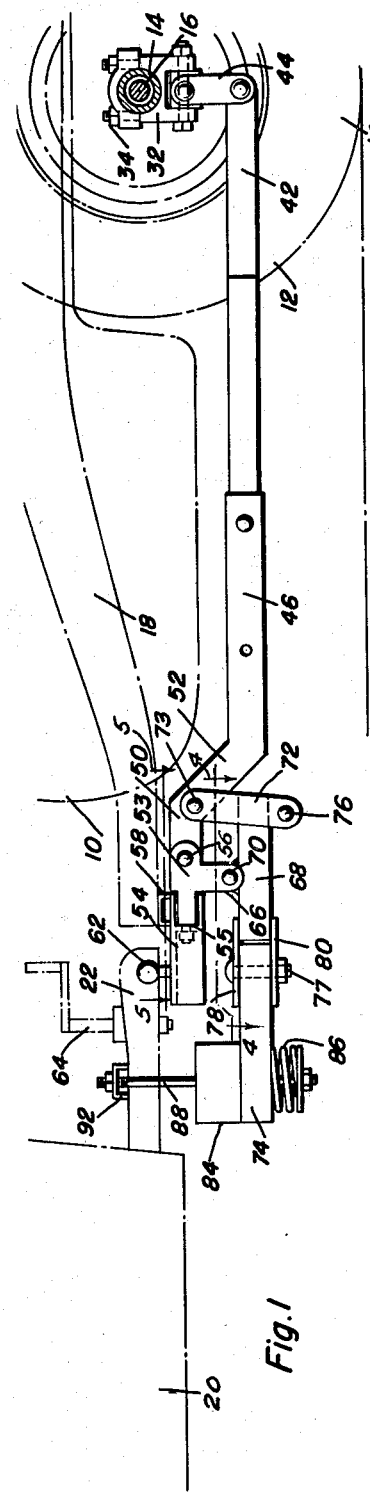
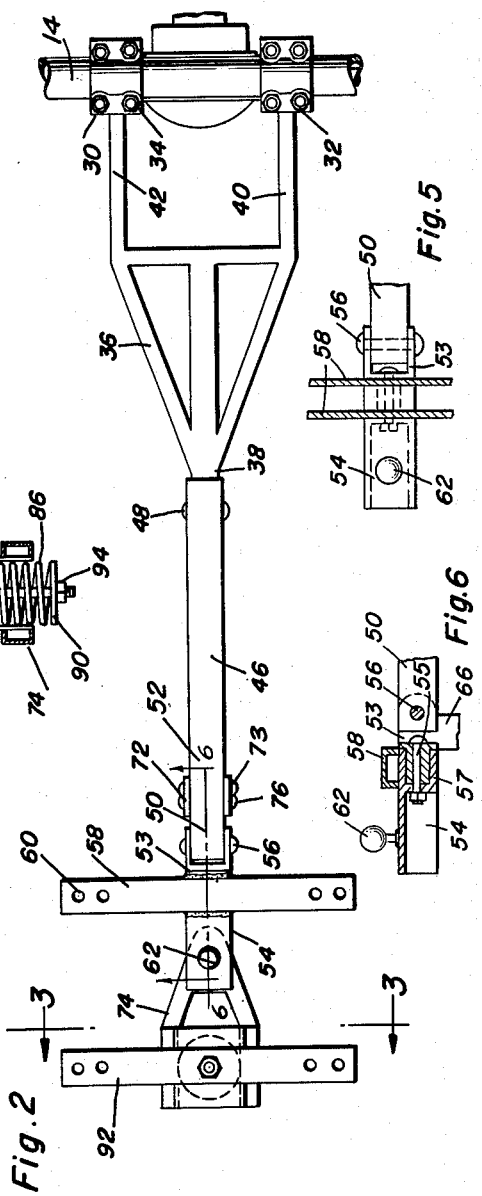
Lee Emile Wettstein
INVENTOR.

United States Patent Office 2,772,893
Patented Dec. 4, 1956

2,772,893

LOAD EQUALIZING TRAILER HITCH

Lee Emile Wettstein, Madison, Ind.

Application July 23, 1954, Serial No. 445,247

6 Claims. (Cl. 280—406)

This invention relates to a trailer hitch, and particularly to a trailer hitch adapted to connect the weight of a trailing vehicle onto the axle housing of an automotive towing vehicle and to be adapted to tilt the rearward end of the towing vehicle upward to prevent vertical displacement of the lights of the towing vehicle.

In the operation of towing vehicles from a towing or tractor vehicle, considerable difficulty has heretofore been experienced because of the weight of the trailer vehicle weighing down the rearward portion of the tractor vehicle so that the headlights are inclined upwardly to produce a dangerous glare to approaching drivers.

The present invention provides a trailer hitch having means for supporting the weight of the trailer vehicle on the axle housing of the towing vehicle and applying the pressure to the frame of the towing vehicle by a toggle connection so that the downward pressure of the weight of the trailer causes an upward motion of the rear end of a towing vehicle so that the lights and other forward portions of the car are not unduly elevated.

In the construction according to the invention, a frame is hingedly connected onto the axle housing by any suitable anchoring means, such as U-bolts, and an extension member or reach member is adjustably mounted on the frame and extends rearwardly of the towing vehicle with the rear end of the reach member being vertically offset adjacent the rear end of the towing vehicle and a hook bar hingedly connected to the reach bar and having a contact member engaging the underneath side of the vehicle frame and a toggle member connected between the reach bar and the trailer vehicle operative to elevate the hook bar with respect to the trailer vehicle.

It is accordingly an object of the invention to provide an improved trailer hitch.

It is a further object of the invention to provide a trailer hitch which will urge the rear end of a towing vehicle upward.

It is a further object of the invention to provide a trailer hitch having a toggle connection for operating the trailer hitch.

Other objects and many of the attendant advantages of the present invention will be apparent from the following detailed description taken in conjunction with the accompanying drawing in which:

Figure 1 is a side elevation of the tractor hitch according to the invention and showing the manner of connecting the same to a towing and trailing vehicle;

Figure 2 is a top plan view of the trailer hitch showing the construction and arrangement thereof;

Figure 3 is a cross-section taken substantially on the plane indicated by section line 3—3 of Figure 2 and showing the utilization of a resilient hitch between the toggle bar and the trailer vehicle;

Figure 4 is an enlarged fragmentary view in horizontal section taken on the line 4—4 of Figure 1;

Figure 5 is an enlarged fragmentary view in horizontal section taken on the line 5—5 of Figure 1, and Figure 6 is an enlarged fragmentary view in longitudinal section taken on the line 6—6 of Figure 2.

In the exemplary embodiment according to the invention, the towing vehicle indicated generally at 10 is mounted on wheels 12 and provided with a rear axle housing 14 having an axle 16 therein and being provided with a longitudinally extending frame 18.

A trailer vehicle 20 is provided with a hitch member 22 extending forwardly of the trailer vehicle 20.

The above noted construction of the towing and trailer vehicles is substantially standard and forms no part of the present invention.

The hitch bar proper comprises anchor members 30 and 32 preferably in the form of clamps adapted to be secured to the rear axle housing 14 by means of bolts 34. A connecting frame 36 has a rearwardly extending tongue-like portion 38 and bifurcated front ends 40 and 42.

The front end portions 40 and 42 are connected to the members 30 and 32 by shackle members 44 which are hingedly connected to the clamp 32 and to the portions 40 and 42, respectively. Frame member 36 may be made of any desired structure, preferably as constructed of channel or angle members to present a rigid relatively light construction.

The rearwardly extending reach member 46 is telescopingly mounted on the portion 38 by means of any suitable means, such as the rivets 48, and extends substantially rearwardly thereof and may be adjusted as desired. The rear end of the reach member 46 is provided with a vertically offset portion 50 connected to the forward portion of reach member 46 by means of an angle portion 52. A hinge bar 53 is hingedly connected to the offset portion 50 of the reach member 46 by means of a pintle pin 56 which permits the hinge bar 53 to move in a vertical plane about the end of the reach member 46. A hook bar 54 is swivelly mounted on the hinge bar 53 by a swivel bolt 55. The bar 54 has a web 57 engaged by the bolt 55.

A contact or pressure bar 58 is rigidly secured to the top of the hook bar 54 and extends transversely under the frame 18 of the towing vehicle. If desired, the contact bar 58 may be connected to the frame 18 by means of the aperture 60.

The ball connector 62 is mounted on the rear end of the hook bar 54 and is adapted to engage in a suitable socket in the forward end of the trailer hitch portion 22 and may be connected thereto by means of a locking mechanism 64 or by any other desired mechanism.

The hinge bar 53 is provided with a depending stud 66 adjacent the forward end thereof and preferably relatively close to the connection with the offset portion 50 of the reach bar 46. The toggle bar 68 is connected to the stud 66 by means of a suitable pintle pin 70.

The toggle bar 68 is hingedly connected to the reach member 46 adjacent the offset portion 50 by means of a shackle 72 which is hingedly connected to the reach bar 46 by means of a pintle pin 73 and to the toggle bar 68 by means of a pintle pin 76. The toggle bar 68 is provided with a rearwardly extended bifurcated member 74 which is hingedly connected to the portion 68 by means of a pivot bolt 77 extending between the plate 78 and a plate 80. The bolt 77 is in direct vertical alignment with the coupling ball 62 so that the bifurcated portion 74 may move about the same axis as the trailer hitch member 22. The spring mounting cup 84 is rigidly secured between the arms of the bifurcated member 74 and a compression spring 86 is mounted therein. An adjusting bolt 88 is connected to the spring 86 by means of a compression plate 90 and is provided adjacent the top side thereof with a connecting bar 92 adapted to rest on and engage the other connector 22. Nuts 94 and 96 are provided on the opposite ends of the connector bolt 88 so that the bifurcated end 74 may be readily adjusted with respect to the member 22.

In the utilization of the trailer hitch according to the invention, the anchor members 30 and 32 are connected to the axle housing 14 by means of the bolts 34 and the frame 36 extends rearwardly under the vehicle and is connected to the platforms 30 and 32 by means of the shackles 44 with the reach member being adjusted so that the transverse bearing member 58 rests against the rear portion of the frame 18. The trailer connector member 22 is connected to the ball pivot 62 and the member 92 is placed on the member 22 and the nuts 94 and 96 adjusted to the desired point. It will be apparent that as the member 74 approaches the member 22, the bar 54 must move upwardly about the ball 62 as a pivot so that the contact bar 58 will be pushed upwardly against the frame 18 causing the rear portion of the towing vehicle 10 to be lifted up so that the headlights will be deflected downwardly instead of upwardly. Further, the spring 86 will absorb a great deal of the shock between the towing and trailing vehicle so that there will be relatively small movement of the hook bar 54 with respect to the vehicle 10 so that the entire device will ride smoothly without unduly rocking or disturbing the equilibrium of the towing vehicle. Vertical play of the axle housing 14 relative to the frame 18 is compensated for by pivotal movement of the shackles 44 relative to the anchor members 30, 32 and to the portions 40, 42 and by vertical swinging of the frame 36 and reach member 46 on said shackles 44 and the pivot 56.

For purposes of exemplification, a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. A trailer hitch comprising a bifurcated frame, hinge members adapted to connect said frame to the axle housing of a vehicle, a reach member longitudinally adjustable on said frame, a hinge bar vertically swingable on the end of said reach member, a hook bar mounted on said hinge bar to swing therewith, a transverse bar on said hook bar adapted to engage the frame of a vehicle, a toggle arm hingedly connected to said reach member and to said hinge bar, said toggle arm extending rearwardly of said hook bar, a resilient connection adjacent the end of said toggle arm adapted to adjustably engage a trailer, and a hitch member on said hook bar for coupling to a corresponding hitch member on a trailer tongue.

2. A trailer hitch comprising a bifurcated frame, hinge members adapted to connect said frame to the axle housing of a vehicle, a rear member longitudinally adjustable on said frame, a hinge bar vertically swingable on the end of said reach member, a hook bar mounted on said hinge bar to swing therewith, a transverse bar on said hook bar adapted to engage the frame of a vehicle, a toggle arm hingedly connected to said reach member and to said hinge bar, said toggle arm extending rearwardly of said hook bar, a resilient connection adjacent the end of said toggle arm adapted to adjustably engage a trailer, said toggle arm being articulated for lateral swinging motion, and a hitch member on said hook bar for coupling to a corresponding hitch member on a trailer tongue.

3. A trailer hitch comprising a bifurcated frame, hinge members adapted to connect said frame to the axle housing of a vehicle, a rear member longitudinally adjustable on said frame, a hinge bar vertically swingable on the end of said reach member, a hook bar mounted on said hinge bar to swing therewith, a transverse bar on said hook bar adapted to engage the frame of a vehicle, a toggle arm hingedly connected to said reach member and to said hinge bar, said toggle arm extending rearwardly of said hook bar, a resilient connection adjacent the end of said toggle arm adapted to adjustably engage a trailer, a pivot ball mounted on said hook bar for coupling to a corresponding hitch member on a trailer tongue, a hinge joint in said toggle bar in alignment with said pivot ball.

4. A trailer hitch comprising a frame, hinge means adapted to mount said frame on the rear axle housing of a vehicle, a reach member mounted on said frame, the rear end of said reach member being vertically offset, a hinge bar hingedly mounted for vertical swinging movement on the end of said reach member, a hook bar mounted on said hinge bar to swing therewith, a transverse vehicle engaging bar on said hook bar, a ball coupler mounted adjacent the free end of said hinge bar for coupling to a corresponding socket on a trailer tongue, a rearwardly extending toggle bar, a depending stud on said hook bar, said stud being hingedly secured on said toggle bar, a hinge device hingedly securing said toggle bar to the offset portion of said reach member, a resilient connection adapted to secure said toggle bar to a trailer device.

5. A trailer hitch comprising a frame, hinge means adapted to mount said frame on the rear axle housing of a vehicle, a reach member mounted on said frame, the rear end of said reach member being vertically offset, a hinge bar hingedly mounted for vertical swinging movement on the end of said reach member, a hook bar mounted on the hinge bar to swing therewith, a transverse vehicle engaging bar on said hook bar, a ball coupler mounted adjacent the free end of said hook bar for connection to a corresponding socket on a trailer tongue, a rearwardly extending toggle bar, a depending stud on said hinge bar, said stud being hingedly secured on said toggle bar, a hinge device hingedly securing said toggle bar to the offset portion of said reach member, a spring seat on the rear end of said toggle bar, a compression spring in said seat, a bolt connected on said spring and adapted to be adjustably secured on a trailer device.

6. A trailer hitch comprising a bifurcated frame, anchor members adapted to be secured on the rear axle housing of a vehicle, shackle members hingedly securing said anchor members to the bifurcated ends of said frame, a reach member longitudinally adjustably mounted on said frame, the rearward end of said reach member being vertically offset, a hinge bar hingedly connected to the offset end of said reach member, a hook bar mounted on said hinge bar to swing therewith, a ball coupler mounted adjacent the rear end of said hook bar for connection to a corresponding socket on a trailer tongue, a bearing bar fixed on said hook bar, a depending stud on said hinge bar adjacent the forward end thereof, a toggle bar hingedly mounted on said stud, a shackle hingedly connecting said toggle bar to said reach member, said toggle bar being articulated in the vertical axis of said ball coupler, and a vertically adjustable connector adapted to secure said toggle bar to a trailer.

References Cited in the file of this patent
UNITED STATES PATENTS
2,680,626     Hedgpeth     June 8, 1954